United States Patent
Wang et al.

(10) Patent No.: US 8,220,322 B2
(45) Date of Patent: Jul. 17, 2012

(54) FUEL PRESSURE SENSOR PERFORMANCE DIAGNOSTIC SYSTEMS AND METHODS BASED ON HYDROSTATICS IN A FUEL SYSTEM

(75) Inventors: Wenbo Wang, Novi, MI (US); Michael J. Lucido, Northville, MI (US); Vincent A. White, Northville, MI (US)

(73) Assignee: GM Global Technology Operations LLC

( * ) Notice: Subject to any disclaimer, the term of this patent is extended or adjusted under 35 U.S.C. 154(b) by 434 days.

(21) Appl. No.: 12/433,254

(22) Filed: Apr. 30, 2009

(65) Prior Publication Data

US 2010/0275679 A1   Nov. 4, 2010

(51) Int. Cl.
    *G01M 15/09* (2006.01)
(52) U.S. Cl. .................................................. 73/114.43
(58) Field of Classification Search ............... 73/114.38, 73/114.41, 114.42, 114.43, 114.45, 114.48, 73/114.51
See application file for complete search history.

(56) References Cited

U.S. PATENT DOCUMENTS

| | | | | |
|---|---|---|---|---|
| 5,616,837 | A * | 4/1997 | Leonard et al. | 73/114.43 |
| 7,437,234 | B2 * | 10/2008 | Halleberg | 701/104 |
| 7,806,106 | B2 * | 10/2010 | Cinpinski et al. | 123/446 |
| 7,950,371 | B2 * | 5/2011 | Cinpinski et al. | 123/446 |
| 2010/0206269 | A1 * | 8/2010 | Cinpinski et al. | 123/456 |
| 2010/0263630 | A1 * | 10/2010 | Cinpinski et al. | 123/458 |
| 2010/0280741 | A1 * | 11/2010 | Wang et al. | 701/103 |

OTHER PUBLICATIONS

U.S. Appl. No. 12/433,192, filed Apr. 30, 2009, Wenbo Wang.

* cited by examiner

*Primary Examiner* — Eric S McCall

(57) ABSTRACT

An engine control system comprises a model pressure determination module and a sensor diagnostic module. The model pressure determination module determines a modeled fuel rail pressure based on a fuel pump flow rate and an engine fuel flow rate. The sensor diagnostic module generates a status of a fuel rail pressure sensor based on a comparison of the modeled fuel rail pressure and a sensed fuel rail pressure sensed by the fuel rail pressure sensor.

16 Claims, 3 Drawing Sheets

FUEL PRESSURE SENSOR PERFORMANCE DIAGNOSTIC SYSTEMS AND METHODS BASED ON HYDROSTATICS IN A FUEL SYSTEM

CROSS-REFERENCE TO RELATED APPLICATIONS

This application is related to U.S. patent application Ser. No. 12/433,192 filed on Apr. 30, 2009. The disclosures of the above application is incorporated herein by reference in its entirety.

FIELD

The present disclosure relates to diagnosis of a fuel pressure sensor and more particularly to diagnosis of a fuel pressure sensor based on hydrostatics in a fuel system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel rail pressure sensor generates a pressure signal based on fuel pressure inside a fuel rail of an engine. The pressure sensor may output signals within a sensor range. For example, when the pressure sensor is de-energized (unplugged), the output may be a lower limit, and when the pressure sensor is short-circuited to a power source, the output may be the upper limit. The lower limit and the upper limit may define the sensor range.

The fuel pressure in the engine operates within an operating range corresponding to operating conditions of the engine. The pressure sensor is selected so that the operating range is between the lower limit and the upper limit of the sensor. The pressure sensor may sense the full operating range of the engine without reaching the lower limit or the upper limit of the sensor range. Fuel control may use the fuel pressure to determine fueling to the engine. A malfunctioning fuel pressure sensor may affect fuel control.

SUMMARY

An engine control system comprises a model pressure determination module and a sensor diagnostic module. The model pressure determination module determines a modeled fuel rail pressure based on a fuel pump flow rate and an engine fuel flow rate. The sensor diagnostic module generates a status of a fuel rail pressure sensor based on a comparison of the modeled fuel rail pressure and a sensed fuel rail pressure sensed by the fuel rail pressure sensor.

In other features, the comparison includes determining a pressure difference between the modeled fuel pressure and the sensed fuel pressure, and the status includes a failure status when the difference is greater than a predetermined threshold.

In still other features, the model pressure determination module determines the modeled fuel rail pressure based on a difference between the fuel pump flow rate and the engine fuel flow rate. An engine flow rate determination module determines the engine fuel flow rate based an injector fuel flow rate. The engine fuel flow rate is based on at least one of a plurality of fuel injectors and engine speed. The injector fuel flow rate is based on at least one of fuel flow rate at a reference pressure and the modeled fuel rail pressure. A pump flow determination module determines the fuel pump flow rate based on at least one parameter from a group consisting of engine speed and fuel pump characteristics that include fuel pump frequency, fuel pump flow capacity, and an inlet valve duty cycle. The inlet valve duty cycle controls a fuel pump inlet valve to vary the fuel pump flow rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
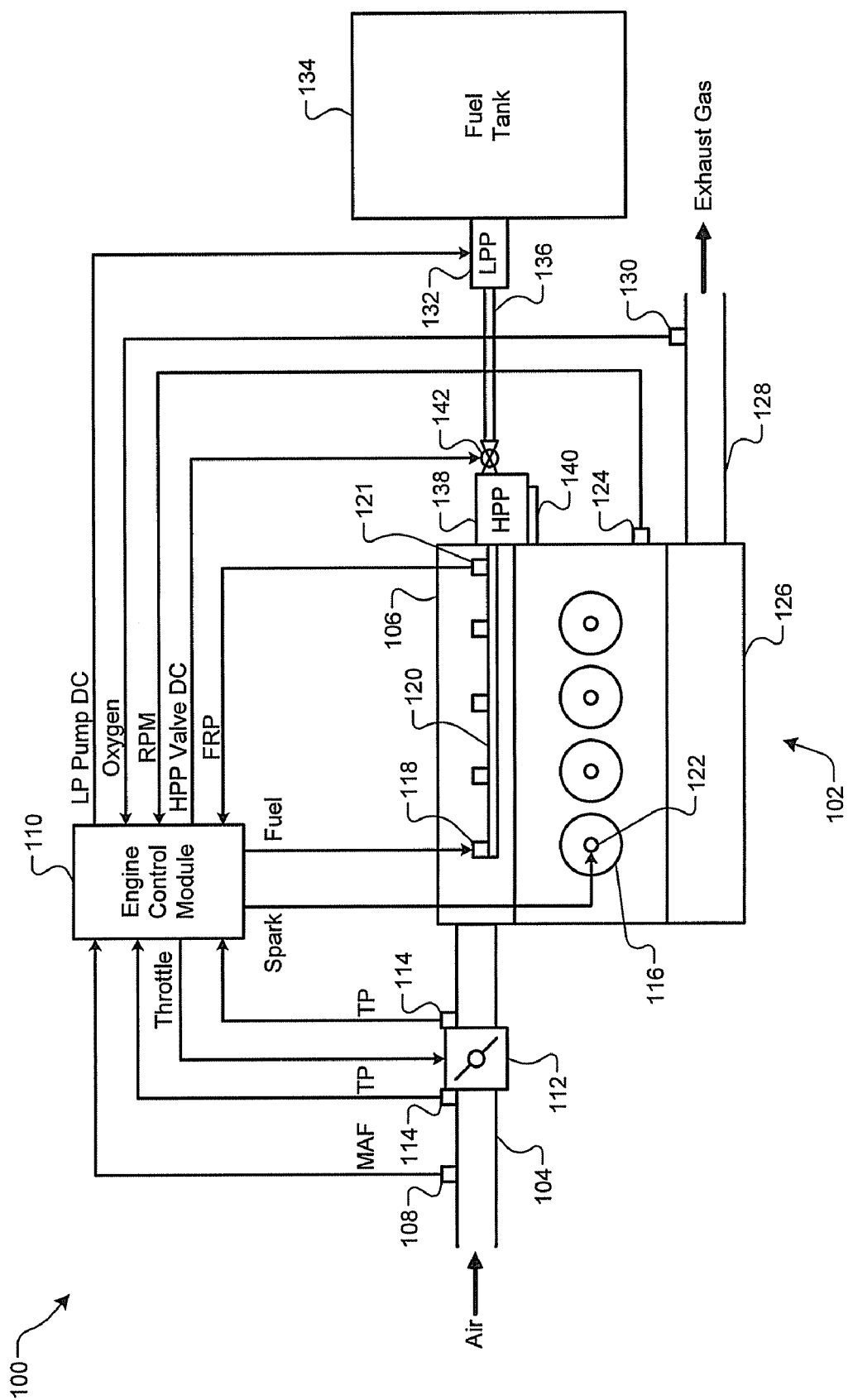
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The fuel pressure sensor performance diagnostic systems and methods of the present disclosure detect a malfunction of the fuel pressure sensor based on a comparison of the sensed fuel rail pressure (FRP) and a modeled FRP ($FRP_{mod}$). $FRP_{mod}$ may be based on a comparison of a fuel flow from a fuel pump into the fuel rail and a fuel flow from the fuel rail into the engine. The comparison corresponds to a change in the fuel rail pressure. The diagnostic systems and methods may evaluate the fuel rail as a control volume and the fuel as having a bulk modulus value to determine $FRP_{mod}$ based on the pump flow rate and the engine flow rate.

Referring now to FIG. 1, an exemplary implementation of an internal combustion engine system 100 is shown. Air enters an engine 102 through an air inlet 104 and travels to an intake manifold 106. A mass airflow sensor 108, disposed in the inlet 104, generates a mass airflow (MAF) signal based on the air entering the engine 102 and sends the MAF signal to an engine control module (ECM) 110.

An intake throttle valve (ITV) 112 may be disposed in the inlet 104 to control the air entering the engine 102. The ECM 110 may control the ITV 112 by a throttle signal that may be based on an input from a driver or other input conditions. The ITV 112 may open and close to increase and decrease the mass airflow. Throttle position sensors 114 generate throttle position (TP) signals based on the ITV position and send the TP signals to the ECM 110. The intake manifold 106 distributes the air to cylinders 116.

Fuel injectors 118 may be attached to a fuel rail 120 to inject fuel into the cylinders 116. The amount of fuel injected creates an air/fuel mixture having an air/fuel ratio. The air/fuel ratio may be a mass ratio of an air charge in the cylinders 116 and the fuel mass injected. The air/fuel mixture may be a stoichiometric air/fuel ratio of approximately 14.7/1. The air charge may be determined based on the mass airflow from the MAF sensor 108. A desired fuel mass may be based on the mass airflow.

The fuel injector 118 is in fluid communication with the fuel rail 120 and includes an injector opening. The injector opening may include an effective cross-sectional area ($A_e$) through which fuel may be injected into the cylinder 116. The fuel injector 118 may flow a reference flow rate $(dm_f/dt)_{ref}$ of fuel through the opening at a reference fuel pressure ($P_{ref}$). For example only, the fuel injector 118 may flow 24 lb/hr of fuel at 40 psi.

The ECM 110 may open and close the injector 118 based on an injection duration. The injection duration may be the time during which the injector is open and may flow fuel through the injector 118. For example only, the injector 118 may open when the injection duration is greater than zero and remain open for the injection duration.

A fuel pressure sensor 121 senses a fuel rail pressure (FRP) of the fuel rail 120 and sends a FRP signal based on the pressure to the ECM 110. The ECM 110 may determine the injection duration based on the FRP and the fuel desired mass. For example only, the ECM 110 may open the injector 118 for the injection duration to deliver the desired fuel mass.

Pistons (not shown) within the cylinders 116 compress the air/fuel mixture. In a spark-ignition gasoline engine, a spark plug 122 may ignite the air/fuel mixture. The ECM 110 may generate a spark signal to control the ignition by the spark plug 122. In a diesel or compression-ignition engine, the air/fuel mixture may be ignited by compression in the cylinders 116. The principles of the present disclosure may be applied to both gasoline and diesel engines.

Upon ignition, the air/fuel mixture combusts and causes an increase in pressure inside the cylinders 116. The pressure causes the pistons to rotate a crankshaft (not shown) in the engine 102 and produce a drive torque. An engine speed sensor 124 detects rotational movement of the crankshaft and sends an engine speed (RPM) signal to the ECM 110 based on a number of crankshaft revolutions per minute.

The combustion of the air/fuel mixture also causes exhaust gas to form in the cylinders 116. The pistons force the exhaust gas to exit the cylinders 116 through an exhaust system including an exhaust manifold 126 and an exhaust pipe 128. The exhaust gas may contain an amount of oxygen remaining from the combustion of the air/fuel mixture.

An oxygen sensor 130 may be located in the exhaust system. The oxygen sensor generates an oxygen signal based on the concentration of oxygen in the exhaust gas and sends the oxygen signal to the ECM 110. The amount of oxygen may correspond to the air/fuel mixture combusted in the cylinders 116. For example, when the air/fuel mixture is greater than the stoichiometric ratio (a lean mixture), the exhaust gas may contain more oxygen than when the air/fuel mixture is less than the stoichiometric ratio (a rich mixture). The ECM 110 may use the amount of oxygen in the exhaust to adjust the injection duration.

Continuing with the engine system of FIG. 1, a low-pressure pump (LPP) 132 may supply fuel from a fuel tank 134 to a fuel line 136. The LPP 132 may be powered by an electric motor that is controlled by an LPP duty cycle signal generated by the ECM 110. For example, as the LPP duty cycle increases, the motor speed may increase, causing the LPP 132 to supply more fuel to the fuel line 136. The LPP 130 may provide fuel to the fuel line 136 at a first pressure. The first pressure may be a low fuel pressure that is less than the fuel pressure in the fuel rail 120.

A high-pressure pump (HPP) 138 supplies fuel from the fuel line 136 to the fuel rail 120. The HPP 138 may be a centrifugal pump connected to the crankshaft of the engine 102 by a shaft 140. The HPP 138 may be connected to the crankshaft by a belt and pulley system (not shown). As the crankshaft rotates, the HPP 138 rotates and supplies fuel to the fuel rail 120 at a pump flow rate ($Q_{pmp}$).

$Q_{pmp}$ may be based on engine speed. $Q_{pmp}$ may be based on characteristics of the HPP 138. For example, the characteristics may include a pump flow capacity and/or a pump frequency. The pump frequency may be a number of pumping events per engine revolution. The pump volume displacement may be a volume of fuel pumped per pumping event.

An HPP valve 142 may be located near an inlet of the HPP 138. The HPP valve 142 may control the fuel entering the HPP 138 from the fuel line 136. The valve 142 may be opened and closed by an electric motor that is controlled by an HPP duty cycle signal generated by the ECM 110. For example, as the HPP duty cycle increases, a voltage supplied to the motor may increase, causing the valve 142 to open.

When the valve 142 is open, fuel may flow into the HPP 138. Increasing the opening may increase the fuel flowing into the HPP 138. $Q_{pmp}$ may also be based on the HPP duty cycle. The HPP duty cycle may be based on the engine speed or mass airflow. The HPP 138 supplies pressurized fuel to the fuel rail 120 at a second pressure that is greater than the first pressure. The fuel rail 120 distributes the fuel to the fuel injectors 118.

Figure 2:
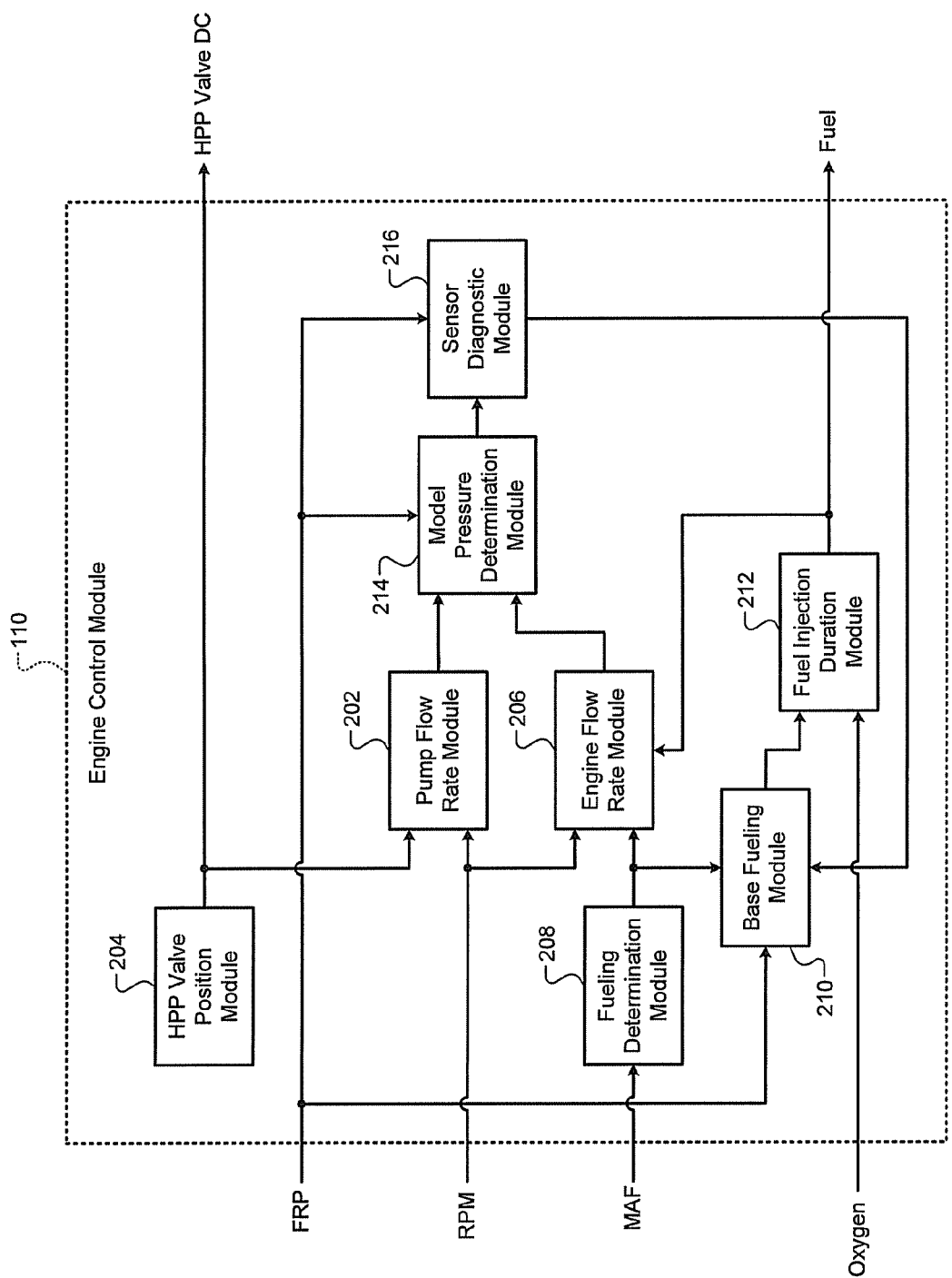
FIG. 2 is a functional block diagram of an exemplary implementation of an engine control module according to the principles of the present disclosure.

Referring now to FIG. 2, an exemplary implementation of the engine control module 110 is shown. The ECM 110 may include a pump flow rate module 202 that determines the fuel pump flow rate ($Q_{pmp}$). $Q_{pmp}$ may be based on engine speed and the HPP valve duty cycle. $Q_{pmp}$ may be based on pump characteristics including pump capacity and pump frequency. An HPP value position module 204 generates the HPP duty cycle signal.

The ECM 110 may include an engine flow rate module 206 that determines an engine fuel flow rate ($Q_{eng}$). $Q_{eng}$ may be based on the fuel flow rate of the injectors 118. A single injector 118 may inject the desired fuel mass in a single injection. The single injection occurs while the injector 118 is open for the injection duration. The fuel flow rate of the single injection may be determined based on the desired fuel mass, the injection duration, and the fuel density. The engine flow rate determination module 206 may determine $Q_{eng}$ based on the desired fuel mass, the injection duration, engine speed, and the number of fuel injectors.

A fueling determination module 208 may determine the desired fuel mass based on the MAF signal. The desired fuel mass is the mass of fuel that mixes with the air mass in the cylinder 116 to create the desired air/fuel ratio. The desired fuel mass may be determined based on the air mass in the cylinder 116 and a stoichiometric air/fuel ratio.

A base fueling module 210 may determine a base fueling duration or base pulse width (BPW) for the fuel injector 118. The BPW may be based on the desired fuel mass and the sensed FRP. For example only, the BPW may be a lookup table based on fuel mass and fuel pressure. For a given desired fuel mass and sensed FRP, a BPW may be specified.

A fuel injection duration module 212 generates the injection duration based on the BPW and a fuel correction value. For example, the fuel correction may be based on the oxygen signal from the oxygen sensor 130. The fuel correction may correct the injection duration when the pressure sensor 121 is malfunctioning.

For example only, a malfunctioning pressure sensor 121 may indicate a higher FRP value than actually exists in the fuel rail 120. The higher, incorrect FRP value may then be used to determine the BPW from the lookup table. The BPW may be less than a BPW using the correct FRP value. The injection duration, therefore, may also be less than what is needed to deliver the desired fuel mass.

The decreased injection duration may cause less fuel to be injected into the cylinder 116 than the desired fuel mass because the injector 118 is open for a shorter duration. The oxygen sensor 130 may detect an increased oxygen amount in the exhaust gas due to the decrease in fuel injected. Fuel injection duration module 212 may adjust the injection duration based on the oxygen amount to compensate for the incorrect FRP value.

A model pressure determination module 214 determines the modeled fuel rail pressure ($FRP_{mod}$) based on $Q_{pmp}$ and $Q_{eng}$. The model pressure determination module 214 may evaluate the fuel rail 120 as a control volume and the fuel as having a bulk modulus value ($\beta$). $FRP_{mod}$ may initially be set equal to the sensed FRP value. The diagnostic may determine a change in the fuel rail pressure based on a difference between $Q_{pmp}$ and $Q_{eng}$. The difference may cause a volumetric change in the fuel rail 120 that corresponds to a change in $FRP_{mod}$. The model pressure determination module 214 may determine $FRP_{mod}$ based on $Q_{pmp}$, $Q_{eng}$, the initial sensed FRP, and $\beta$.

A sensor diagnostic module 216 compares $FRP_{mod}$ to the sensed FRP. When the absolute value of the difference between $FRP_{mod}$ and the sensed FRP is greater than a predetermined pressure threshold, the sensor diagnostic module 216 outputs a fault status of the fuel pressure sensor 121. The sensor diagnostic module 216 may indicate the status to the base fueling module 210. When a fault status is generated, the base fueling module 216 may determine the BPW using $FRP_{mod}$ and the desired fuel mass rather than using the sensed FRP.

Regarding the model pressure determination module 214, $FRP_{mod}$ may be determined based on hydrostatics principles. Mathematically speaking, $FRP_{mod}$ may be determined based on principles of hydrostatics using the hydraulic bulk modulus equation:

$$\beta = V_0 \left( \frac{\Delta P}{\Delta V} \right) \quad (1)$$

where $\beta$ is the bulk modulus of the fuel, $V_0$ is a volume of fuel in the rail, $\Delta P$ is the net change in fuel rail pressure, and $\Delta V$ is the net change in fuel volume inside the fuel rail. The bulk modulus of a material indicates how much the material will compress under a given amount of external pressure. The ratio of the change in pressure to the fractional volume compression may be defined as the bulk modulus.

The bulk modulus may be rewritten to include a time dependency as fuel volume inside the rail changes:

$$\frac{dP}{dt} = \frac{\beta_e}{V} \times \frac{dV}{dt} \quad (2)$$

where $\beta_e$ is an effective bulk modulus which may be based on a temperature and composition of the fuel. For example, the effective bulk modulus may be retrieved from a calibrateable lookup table. $dV/dt=Q$ is the volumetric fuel flow change rate in the rail system. The modeled FRP may be represented by:

$$FRP_{mod}(t) = FRP_{mod}(t-1) + \left( \frac{\beta_e \times \Delta V}{V} \right) \quad (3)$$

where $FRP_{mod}(t)$ is the modeled FRP at time t, $FRP_{mod}(t-1)$ is a previous value of $FRP_{mod}$, V is the control volume of the fuel rail, and $\Delta V$ is the net change in fuel volume.

Initially, $FRP_{mod}$ may be set to the sensed FRP. The net change in fuel volume ($\Delta V$) may be due to a volumetric fuel flow rate difference ($\Delta Q$) between $Q_{pmp}$ and $Q_{eng}$. For example, when the pump flow rate is greater than the engine flow rate, the $\Delta V$ may be positive. More fuel volume is pumped into the fuel rail 120 by the HPP 138 than is being injected into the engine 102 from the fuel rail 120. The net change in fuel volume ($\Delta V$) may be calculated as:

$$\Delta V = \Delta t \times (Q_{pmp} - Q_{eng}) \quad (4)$$

where $\Delta t$ is the time during which the volume change occurs, $Q_{pmp}$ is the volumetric pump flow rate, and $Q_{eng}$ is the volumetric engine flow rate.

The pump flow rate module 202 may determine $Q_{pmp}$ based on physical characteristics of the HPP 138, engine speed (RPM), and the HPP valve duty cycle ($DC_{valve}$). For example, $Q_{pmp}$ may determined by:

$$Q_{pmp} = V_{disp} \times f_{pmp} \times RPM \times DC_{valve} \quad (5)$$

where characteristics of the pump may include the pumping frequency ($f_{pmp}$) per engine rotation and the pump volume displacement ($V_{disp}$).

The engine flow determination module 206 may determine the engine flow rate $Q_{eng}$ based on engine speed, a calculated injector fuel mass flow rate, the fuel density, and the injection duration. For example only, based on the reference pressure ($P_{ref}$), the injector 118 flows fuel at the reference injector flow rate $(dm_f/dt)_{ref}$. A single injector mass flow rate $(dm_f/dt)$ may be determined based on $P_{ref}$ and $(dm_f/dt)_{ref}$. For example only, $(dm_f/dt)$ may be determined by:

$$\frac{dm_f}{dt} = \sqrt{\frac{FRP_{mod}}{P_{ref}}} \times \left( \frac{dm_f}{dt} \right)_{ref} \quad (6)$$

The engine flow rate $Q_{eng}$ may be determined based on the single injector mass flow rate, fuel density, the engine speed, and the number of fuel injectors injecting fuel:

$$Q_{eng} = f\left( \frac{dm_f}{dt}, RPM, \rho, \text{injectors} \right) \quad (7)$$

The model pressure determination module 214 may generate $FRP_{mod}$ based on $Q_{pmp}$ and $Q_{eng}$.

Figure 3:
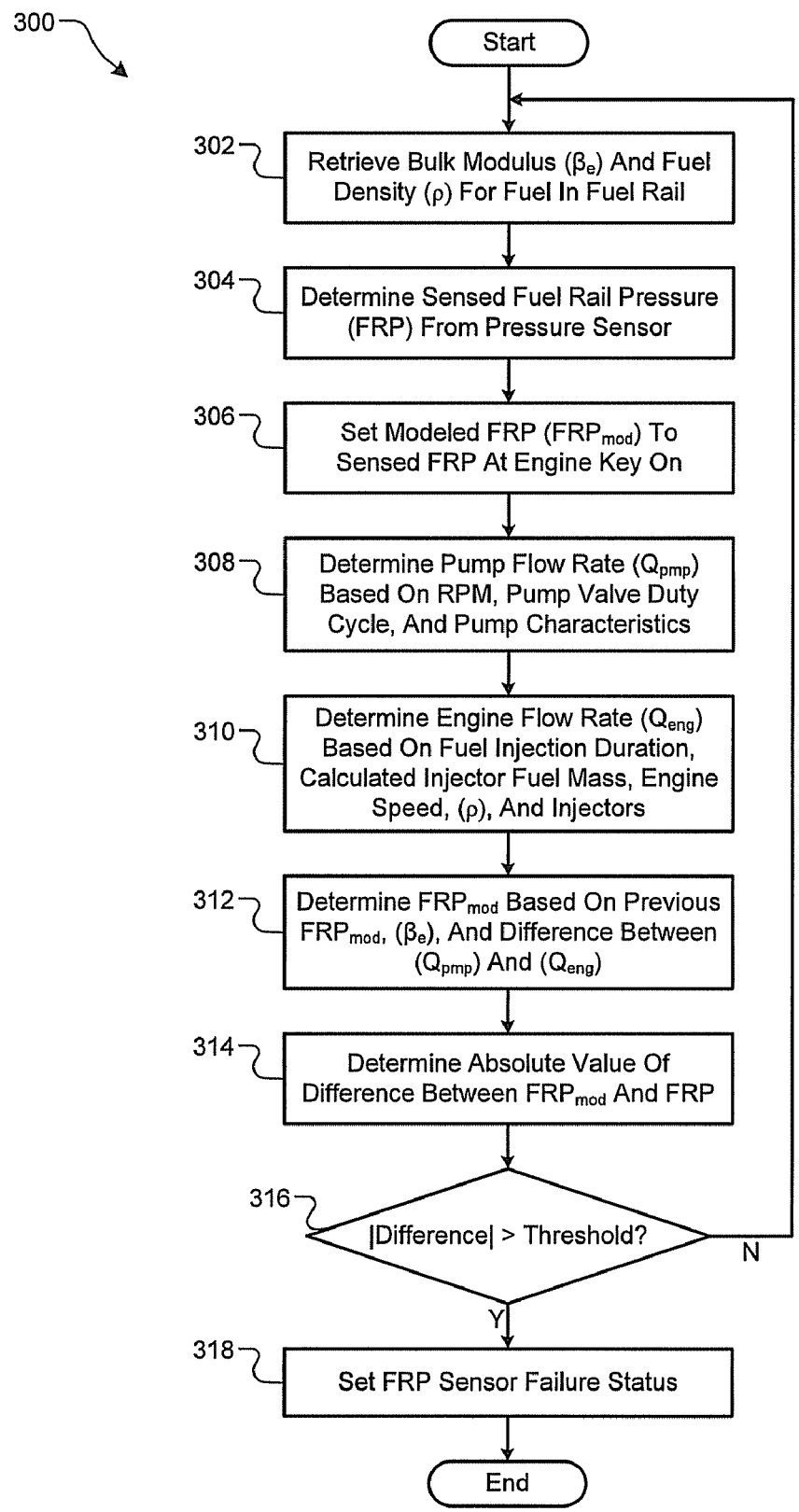
FIG. 3 is a flowchart depicting exemplary steps performed in the engine control module.

Referring now to FIG. 3, a flowchart 300 depicts exemplary steps of an engine control system. Control begins in step 302 when control retrieves the bulk modulus ($\beta_e$) and fuel density ($\rho$) from a calibrateable table as a function of fuel temperature and fuel composition (such as ethanol percentage). In step 304, control determines the sensed FRP based on the FRP signal from the FRP sensor 121. Control initially sets $FRP_{mod}$ equal to the sensed FRP in step 306.

Control continues in step 308 when the pump flow rate module 202 determines the pump flow rate ($Q_{pmp}$) based on the engine speed, the HPP valve DC, and the pump characteristics. In step 310, the engine flow rate module 206 determines the engine flow rate ($Q_{eng}$) based on the fuel injection duration, the calculated injector fuel mass, the engine speed, the fuel density, and the number of injectors.

In step 312, control determines $FRP_{mod}$ based on the previous $FRP_{mod}$, the bulk modulus, and the difference between $Q_{pmp}$ and $Q_{eng}$. The previous $FRP_{mod}$ may be increased or decreased depending on the net change in the flow rate of the fuel rail 120.

In step 314, control may determine a difference between $FRP_{mod}$ and the sensed FRP. In step 316, control determines whether the difference is greater than a predetermined threshold. The difference may include an absolute value of the difference between $FRP_{mod}$ and the sensed FRP. Control may also determine more than one threshold.

For example only, control may determine a first threshold for when the sensed FRP is greater than $FRP_{mod}$ and a second threshold for when the sensed FRP is less than $FRP_{mod}$. When the difference between $FRP_{mod}$ and the sensed FRP is greater than the predetermined threshold, control may indicate a failure of the pressure sensor 121 in step 318. Control may indicate that the BPW should be based on $FRP_{mod}$ rather than the sensed FRP. Otherwise, control returns to step 302.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a model pressure determination module that determines a modeled fuel rail pressure based on a fuel pump flow rate and an engine fuel flow rate; and
a sensor diagnostic module that generates a status of a fuel rail pressure sensor based on a comparison of the modeled fuel rail pressure and a sensed fuel rail pressure sensed by the fuel rail pressure sensor.

2. The engine control system of claim 1, wherein the comparison includes determining a pressure difference between the modeled fuel pressure and the sensed fuel pressure, and wherein the status indicates a failure when the difference is greater than a predetermined threshold.

3. The engine control system of claim 1, wherein the model pressure determination module determines the modeled fuel rail pressure based on a difference between the fuel pump flow rate and the engine fuel flow rate.

4. The engine control system of claim 1, further comprising an engine flow rate determination module that determines the engine fuel flow rate based on an injector fuel flow rate.

5. The engine control system of claim 4, wherein the injector fuel flow rate is based on at least one of a plurality of fuel injectors and engine speed.

6. The engine control system of claim 4, wherein the injector fuel flow rate is based on at least one of mass airflow and the sensed fuel rail pressure.

7. The engine control system of claim 1, further comprising a pump flow determination module that determines the fuel pump flow rate based on at least one parameter from a group consisting of engine speed and fuel pump characteristics that include fuel pump frequency, fuel pump flow capacity, and an inlet valve duty cycle.

8. The engine control system of claim 7, wherein the inlet valve duty cycle controls a fuel pump inlet valve to vary the fuel pump flow rate.

9. A method comprising:
determining a modeled fuel rail pressure based on a fuel pump flow rate and an engine fuel flow rate; and
generating a status of a fuel rail pressure sensor based on a comparison of the modeled fuel rail pressure and a sensed fuel rail pressure sensed by the fuel rail pressure sensor.

10. The method of claim 9, further comprising determining a pressure difference between the modeled fuel pressure and the sensed fuel pressure, and generating a failure status when the difference is greater than a predetermined threshold.

11. The method of claim 9, further comprising determining the engine fuel flow rate based on an injector fuel flow rate.

12. The method of claim 11, further comprising determining the injector fuel flow rate based on at least one of a plurality of fuel injectors and engine speed.

13. The method of claim 11, further comprising determining the injector fuel flow rate based on at least one of mass airflow and the sensed fuel rail pressure.

14. The method of claim 9, further comprising determining the fuel pump flow rate based on at least one parameter from a group consisting of engine speed and fuel pump characteristics that include fuel pump frequency, fuel pump flow capacity, and an inlet valve duty cycle.

15. The method of claim 14, further comprising controlling a fuel pump inlet valve to vary the fuel pump flow rate based on the inlet valve duty cycle.

16. A method comprising:
determining a modeled fuel rail pressure based on a difference between a fuel pump flow rate and an engine fuel flow rate; and
generating a status of a fuel rail pressure sensor based on a comparison of the modeled fuel rail pressure and a sensed fuel rail pressure sensed by the fuel rail pressure sensor.

* * * * *